(12) United States Patent
Zeuthen

(10) Patent No.: US 8,694,615 B2
(45) Date of Patent: Apr. 8, 2014

(54) PROVIDING IDENTIFYING INFORMATION FOR COMPUTERS ON A NETWORK

(75) Inventor: David Zeuthen, Somerville, MA (US)

(73) Assignee: Red Hat, Inc., Raleigh, NC (US)

(*) Notice: Subject to any disclaimer, the term of this patent is extended or adjusted under 35 U.S.C. 154(b) by 474 days.

(21) Appl. No.: 12/613,048

(22) Filed: Nov. 5, 2009

(65) Prior Publication Data

US 2011/0107224 A1    May 5, 2011

(51) Int. Cl.
*G06F 15/177* (2006.01)
*G06F 15/16* (2006.01)
*H04L 29/12* (2006.01)
*H04L 12/24* (2006.01)

(52) U.S. Cl.
CPC ............ *H04L 61/30* (2013.01); *H04L 61/3015* (2013.01); *H04L 41/22* (2013.01)
USPC ............ 709/220; 709/203; 715/734; 715/735

(58) Field of Classification Search
CPC ...... H04L 61/30; H04L 61/3015; H04L 41/22
USPC ........................ 715/734, 735; 709/203, 220
See application file for complete search history.

(56) References Cited

U.S. PATENT DOCUMENTS

| | | | | |
|---|---|---|---|---|
| 6,101,537 | A * | 8/2000 | Edelstein et al. ............. | 709/219 |
| 7,243,306 | B1 * | 7/2007 | Joshi et al. ..................... | 715/735 |
| 2002/0027569 | A1 * | 3/2002 | Manni et al. .................. | 345/764 |
| 2004/0046785 | A1 * | 3/2004 | Keller ........................... | 345/734 |
| 2004/0243931 | A1 * | 12/2004 | Stevens et al. ................ | 715/513 |
| 2005/0210124 | A1 * | 9/2005 | Chua ............................. | 709/219 |
| 2006/0212823 | A1 * | 9/2006 | Bhagat et al. ................. | 715/783 |
| 2008/0040472 | A1 * | 2/2008 | Kato et al. .................... | 709/224 |
| 2008/0052396 | A1 * | 2/2008 | Tell et al. ...................... | 709/226 |
| 2009/0228507 | A1 * | 9/2009 | Jain et al. ..................... | 707/102 |

OTHER PUBLICATIONS

"Fedora 11 Installation Guide: Installing Fedora 11 on x86, AMD64, and Intel® 64 architectures," Ed. 1.0, Fedora Documentation Project, fedora-docs-list@redhat.com, Red Hat, Inc. and others, 2009, 274 pages.
"Fedora 11 User Guide: Using Fedora 11 for common desktop computing tasks," Ed. 1.0, Fedora Documentation Project, fedora-docs-list@redhat.com, Red Hat, Inc. and others, 2009, 118 pages.
Mockapetris, P. "Domain Names—Concepts and Facilities," Network Working Group, Request for Comments: 1034, Nov. 1987, 56 pages.

(Continued)

*Primary Examiner* — Boris Gorney
(74) *Attorney, Agent, or Firm* — Lowenstein Sandler LLP

(57) ABSTRACT

A hostname configuration unit associates a display hostname with a regular hostname of a host, where the regular hostname identifies the host and the display hostname identifies a service associated with the host, where the service is provided by a client application. The hostname configuration unit further associates a graphical representation with the display hostname. A hostname query unit is configured to provide the client application the regular hostname, the display hostname, and the graphical representation in response to a request for hostname data received from the client application. The regular hostname, the display hostname, and the graphical representation are used by the client application to advertise a service to allow a remote node to access the advertised service of the application over a network.

3 Claims, 5 Drawing Sheets

(56) References Cited

OTHER PUBLICATIONS

Alexander, S. et al. "DHCP Options and BOOTP Vendor Extensions," Network Working Group, Request for Comments: 2132, Mar. 1997, 35 pages.

Cheshire, S. et al. "Dynamic Configuration of IPv4 Link-Local Addresses," Network Working Group, Request for Comments: 3927, May 2005, 34 pages.

Arends, R. et al. "Resource Records for the DNS Security Extensions," Network Working Group, Request for Comments: 4034, Mar. 2005, 29 pages.

* cited by examiner

PROVIDING IDENTIFYING INFORMATION FOR COMPUTERS ON A NETWORK

TECHNICAL FIELD

Embodiments of the invention relate generally to the field of network computing; and more particularly, to providing identifying information for computers on a network.

BACKGROUND

A hostname is a unique name by which a network-attached device (which could consist of a computer, file server, network storage device, fax machine, copier, cable modem, etc.) is known on a network. The hostname is used to identify a particular host in various forms of electronic communication such as the World Wide Web, e-mail, or Usenet.

Hostnames are typically used in an administrative capacity and may appear in computer browser lists, active directory lists, Internet protocol (IP) address to hostname resolutions, email headers, etc. They are human-readable nicknames, which ultimately correspond to unique network hardware media access control (MAC) addresses. In some cases the host names may contain embedded domain names and/or locations, non-dotted IP addresses, etc.

For the purpose of identifying a host computer, a standard or persistent hostname is typically in a form of 7-bit American standard code for information interchange (ASCII) character string without special characters, whitespaces, or dots. There is another type of hostname referred to as a display hostname (also referred to as a symbolic or textual hostname) which is in a unicode transformation format (UTF), which can be associated with the standard hostname. The advantage of the display hostname is that it is usually easier to remember.

There has been a lack of user-friendly representation of a host besides the standard hostname and display hostname. In addition, typically, a hostname is statically configured and stored persistently in a local storage device. There has been lack of mechanism to modify the hostname in view of certain network configurations.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a mechanism is provided to retrieve, configure, and monitor changes of hostname data. Hostname data is defined to include more than just the regular hostname; it also includes a display hostname, a graphical representation such as an icon, as well as other information. Hostname data may be based on a user preference and is stored in a persistent local database of a host (e.g., data processing system). In addition, a network configuration interface is provided to inject a transient hostname that, according to the user preference, can take precedence over the local configuration data (e.g., regular hostname). For example, when a system obtains network configuration data via dynamic host configuration protocol (DHCP), auxiliary data such as those defined in RFC-2132 may be used to specify a transient hostname.

Figure 1:
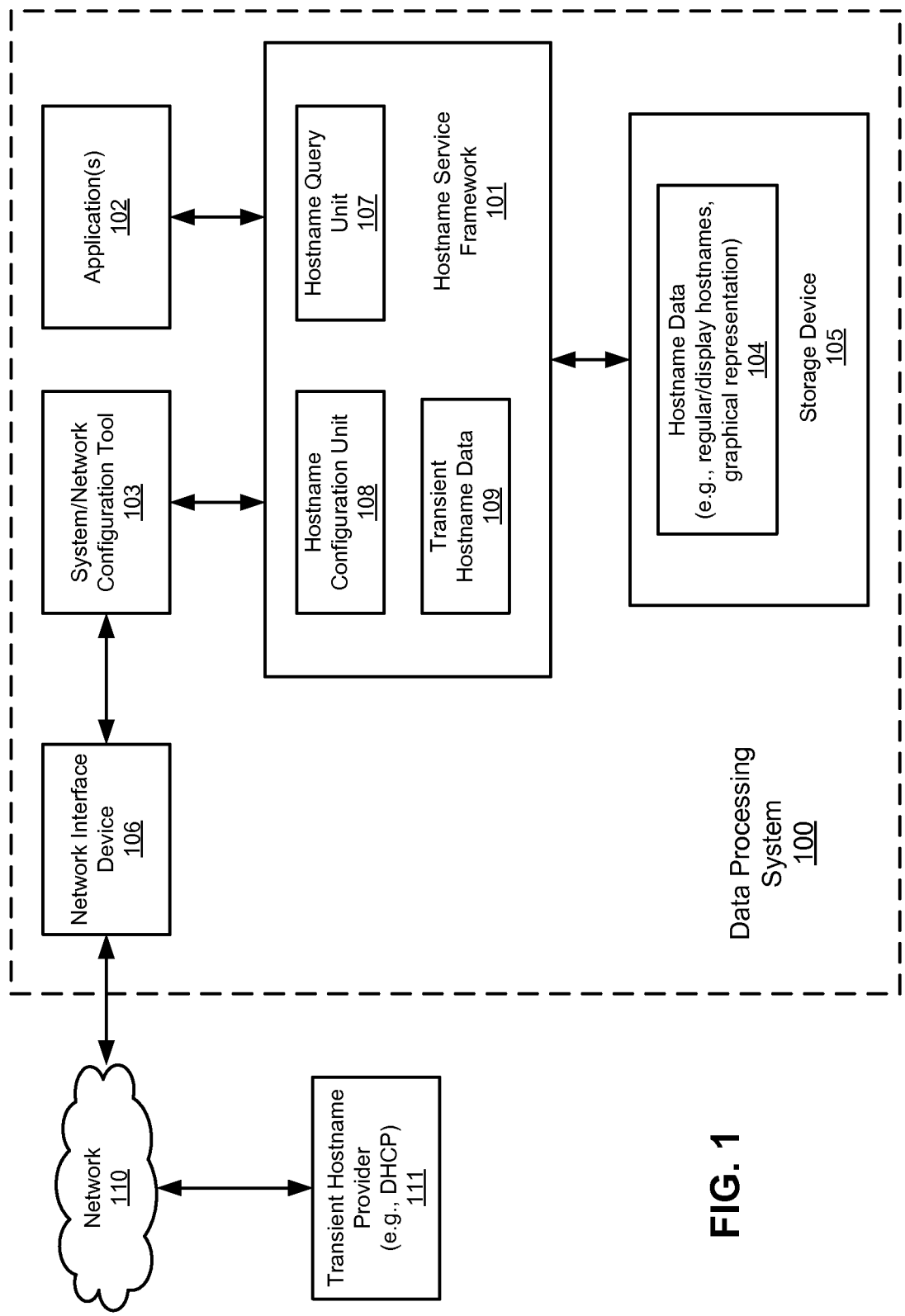
FIG. 1 is a block diagram illustrating a network configuration according to one embodiment.

FIG. 1 is a block diagram illustrating a network configuration according to one embodiment. Referring to FIG. 1, the network configuration includes a host 100 (e.g., data processing system) coupled to a network 110 to access another host or server such as server 111. Host 100 may be client computer or a server computer. Network 110 may be a local area network (LAN) or a wide area network such as the Internet. Network 110 may include multiple different networks.

In one embodiment, system 100 includes, among others, a hostname service framework 101 configured to provide hostname services to a client application 102. For example, application 102 may communicate with hostname service framework, for example, via inter-process call (IPC) or a system message bus such as D-bus, to retrieve hostname data 104 stored in a storage device 105 (e.g., disk). Application 102 can then advertise its services in network 110 using the hostname data 104.

The hostname data 104 may include a regular hostname, a display hostname, and a graphical representation (e.g., an icon) that are used to identify host 100. Hostname data 104 may be configured by a user or an administrator via system/network configuration tool 103. Via system/network configuration tool, a user can specify a regular hostname, a display hostname, and associate a graphical representation (e.g., an icon) with the display hostname. Hostname service framework may be implemented as a component of an operating system, such as a LINUX operating system available from Red Hat, Inc. of Raleigh, N.C.

One benefit from using hostname data 104 provided by the hostname service framework 101 is the display hostname. Compared to the traditional hostname (which normally conforms to RFC-1034 with the hostname being a label: 7 bit ASCII character string without special characters, whitespace or dots) the display hostname is in a UTF-8 format. Application 102 can use the display hostname for announcing services via, for example, domain name system (DNS). For example, a file sharing application may set the service name to "David's files on Kitchen Computer" instead of the less meaningful name of "David's files on localhost."

In addition, hostname service framework 101 introduces the concept of associating an icon (e.g., graphical representation) with a system. This is useful for applications announcing services on the network 110. For example, for DNS service discovery (DNS-SD), a TXT record may be referenced to or attached with an icon name. It is important to understand that the display hostname and the regular or standard hostname are different on a conceptual level. Specifically, the display hostname is, among other things, intended to be used for naming the system's services (e.g. "Recipes on Kitchen Computer") announced via e.g. DNS-SD and the regular hostname (e.g. "t41-davidz") is for identifying the system (e.g., host 100) on which software providing the service runs. One way to think about this is that the display hostname represents what the system 100 does while the regular hostname represents what the system 100 is.

For example, if the system 100 with the regular hostname "t41-davidz" is replaced by another system with the regular hostname "x61-davidz", it is useful to keep the display hostname the same (e.g., "Kitchen Computer") such that clients on the network 110 consuming services ("Recipes on Kitchen Computer") would not need to be reconfigured. Hostname data 104 exported by the hostname service framework 101 is available via a service on a system message bus such as a D-bus in a LINUX operating environment.

Referring back to FIG. 1, according to one embodiment, system/network configuration tool or utility 103 is coupled to the hostname service framework 101 via an API or a system message bus such as D-bus. The system/network configuration tool 103 allows a user or an administrator to statically configure a regular hostname, display hostname, and an icon to be associated with the display hostname, which can be stored by hostname configuration unit 108 in storage device 105 as hostname data 104.

Furthermore, the system/network configuration tool 103 can also allow a user to register an external hostname provider 111 to provide a transient hostname 109 over network 110 that may take precedence of the statically configured hostname data 104. For example, a user may configure via system/network configuration tool 103 and hostname configuration unit 108 a DHCP server as a hostname provider. When host 100 is entering network 110 requesting an IP address from DHCP server (e.g., server 111), the DHCP data returned from the DHCP server may include a regular hostname to be associated with host 100. For example, when a system obtains network configuration data via dynamic host configuration protocol (DHCP), auxiliary data such as those defined in RFC-2132 may be used to specify a transient hostname, where RFC-2132 is incorporated by reference herein in its entirety. The regular hostname can be extracted, for example, by system/network configuration tool 103, from the DHCP data and stored as transient hostname data 109 in a memory (e.g., volatile memory such as a random access memory or RAM). Note that some or all of the components as shown in FIG. 1 may be implemented in software, firmware, hardware, or a combination thereof.

Figure 2:
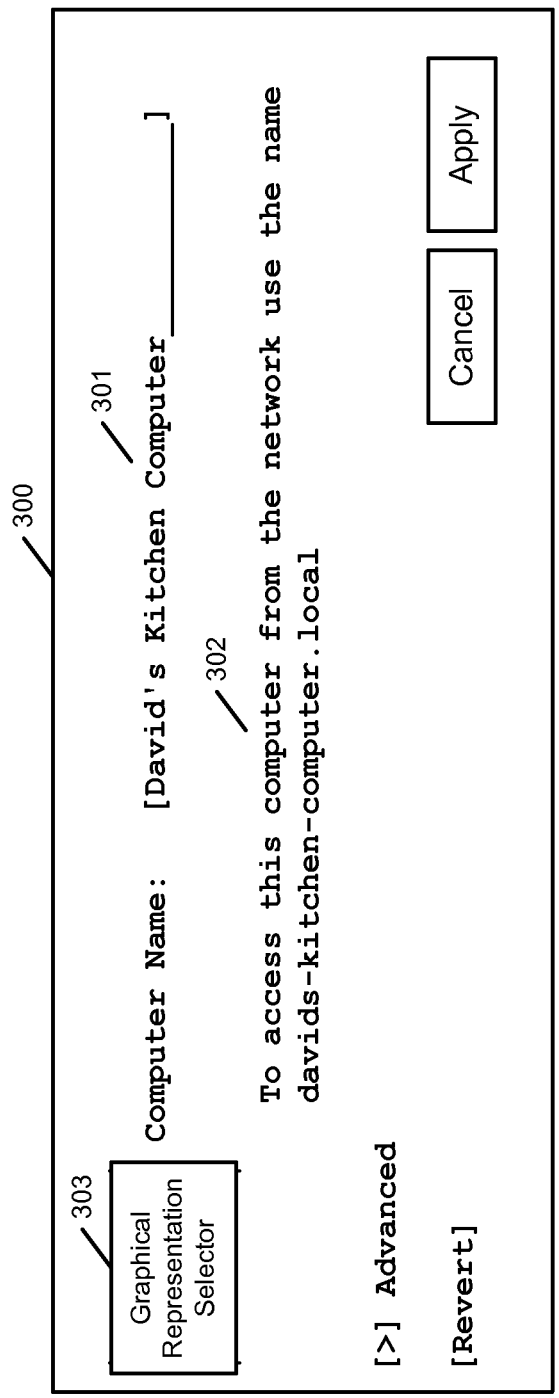
FIGS. 2 and 3 are screenshots illustrating examples of graphical user interfaces which may be used with an embodiment of the invention.
Figure 3:
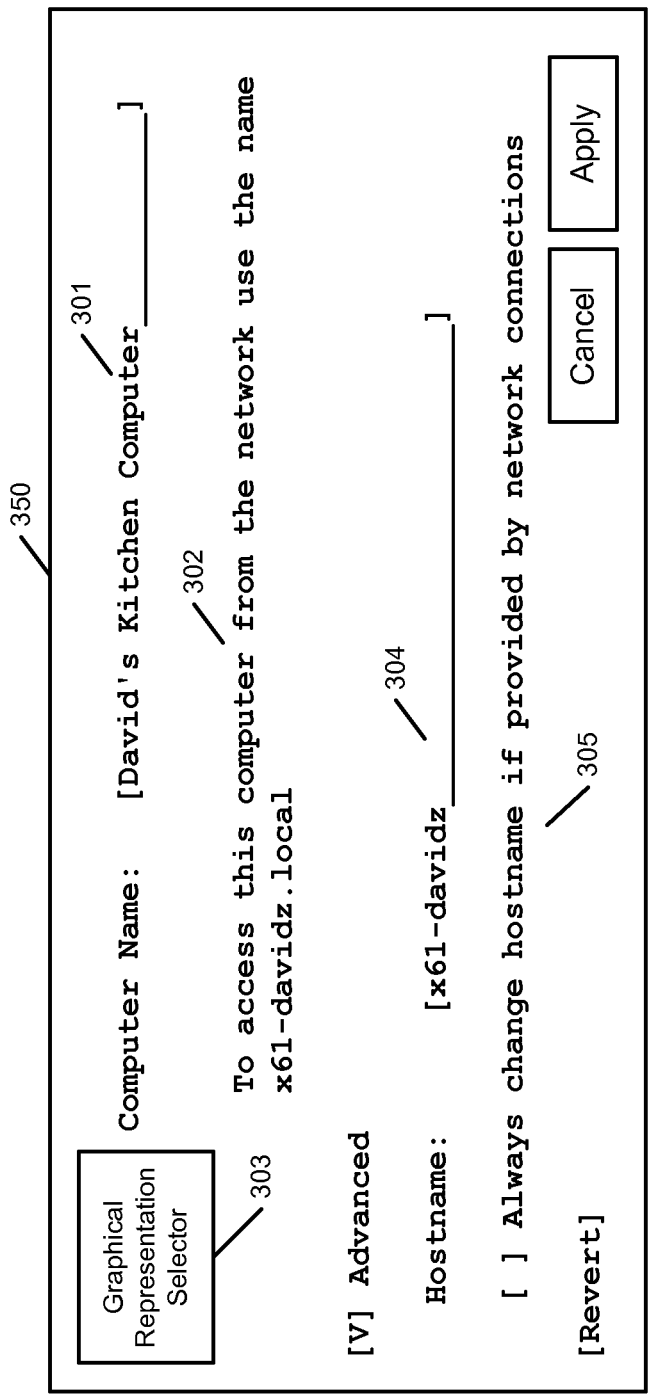

FIGS. 2 and 3 are screenshots illustrating examples of a graphical user interface (GUI) used for configuring hostname data according to some embodiments. Referring to FIG. 2, GUI 300 may be displayed by system/network configuration tool 103 of FIG. 1 to allow a user to configure the hostname data associated with host 100. GUI 300 includes a first field 301 to allow a user to specify a display hostname in field 301, in this example, "David's Kitchen Computer." In response to the display hostname entered in field 301, the hostname configuration unit 108 automatically construct a regular hostname based on the display hostname entered, in this example, "davids-kitchen-computer.local" and the GUI 300 displays a message 302 to the user indicating that the host 100 can be accessed from network 110 based on the regular hostname (e.g., "davids-kitchen-computer.local"). In addition, GUI 300 displays a graphical representation selector 303 as a control or button to allow the user to browse and select a graphical representation (e.g., an icon) to be associated with the display hostname entered in field 301. The hostname data (e.g., the configured display hostname, regular hostname, and the selected icon) is then stored by hostname configuration unit 108 in the storage device 105.

According to an alternatively embodiment, as shown in FIG. 3, a user can specify the regular hostname. Referring to FIG. 3, similar to GUI 300 of FIG. 2, GUI 350 includes field 301 to allow a user to enter a display hostname and a graphical representation selector button 303. In addition, GUI 350 includes a field 304 to allow a user to specify a regular hostname to be associated with the display hostname entered at field 301. Furthermore, GUI 350 further includes an option 305 to allow the user to indicate whether the transient hostname data will take precedence over the one entered at field 304. When a request for query for hostname data is received by hostname query unit 107, if option 305 is enabled and a live transient data provider is registered, then the transient hostname data 109 is returned. Otherwise the statically configured hostname data is returned.

Figure 4:
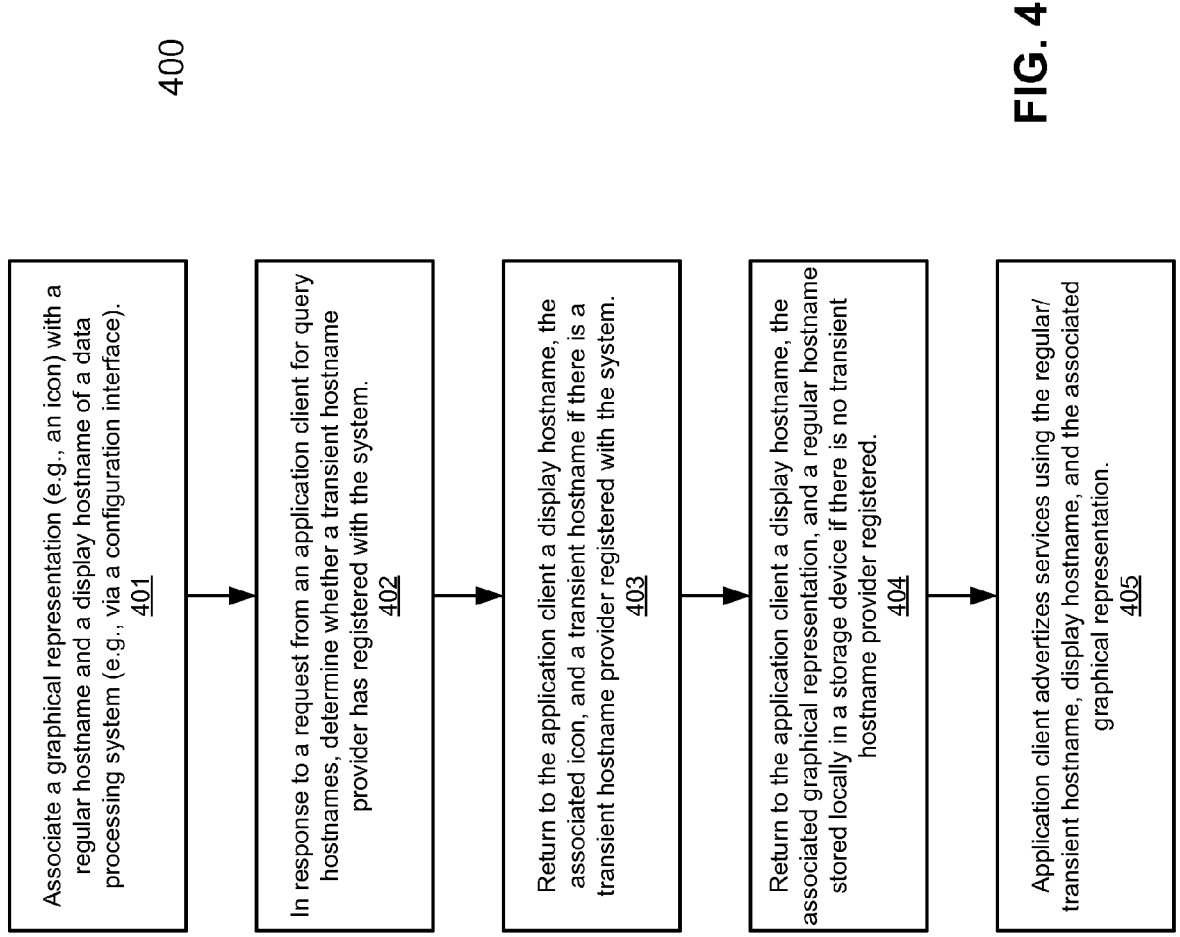
FIG. 4 is a flow diagram illustrating a method for processing hostname data according to one embodiment of the invention.

FIG. 4 is a flow diagram illustrating a method for processing hostname data according to one embodiment of the invention. Note that method 400 may be performed by processing logic which may include software, firmware, hardware, or a combination thereof. For example, method 400 may be performed by the hostname service framework 101 of FIG. 1. Referring to FIG. 4, at block 401, a graphical representation (e.g., an icon) is associated with a regular hostname and a display hostname of a host, for example, via a GUI as shown in FIG. 2 or 3. In response to a request from an application client for querying the hostname data, at block 402, it is determined whether a transient hostname provider has registered with the host. If there is a transient hostname provider registered with the host, at block 403, the transient hostname, display hostname, and the associated graphical representation are returned to the application client. If there is no transient hostname provider registered with the host, at block 404, the statically configured regular hostname, display hostname, and the associated graphical representation are returned to the application client. At block 405, the hostname data is used by the application client for advertising services provided by the application client in a network.

Figure 5:
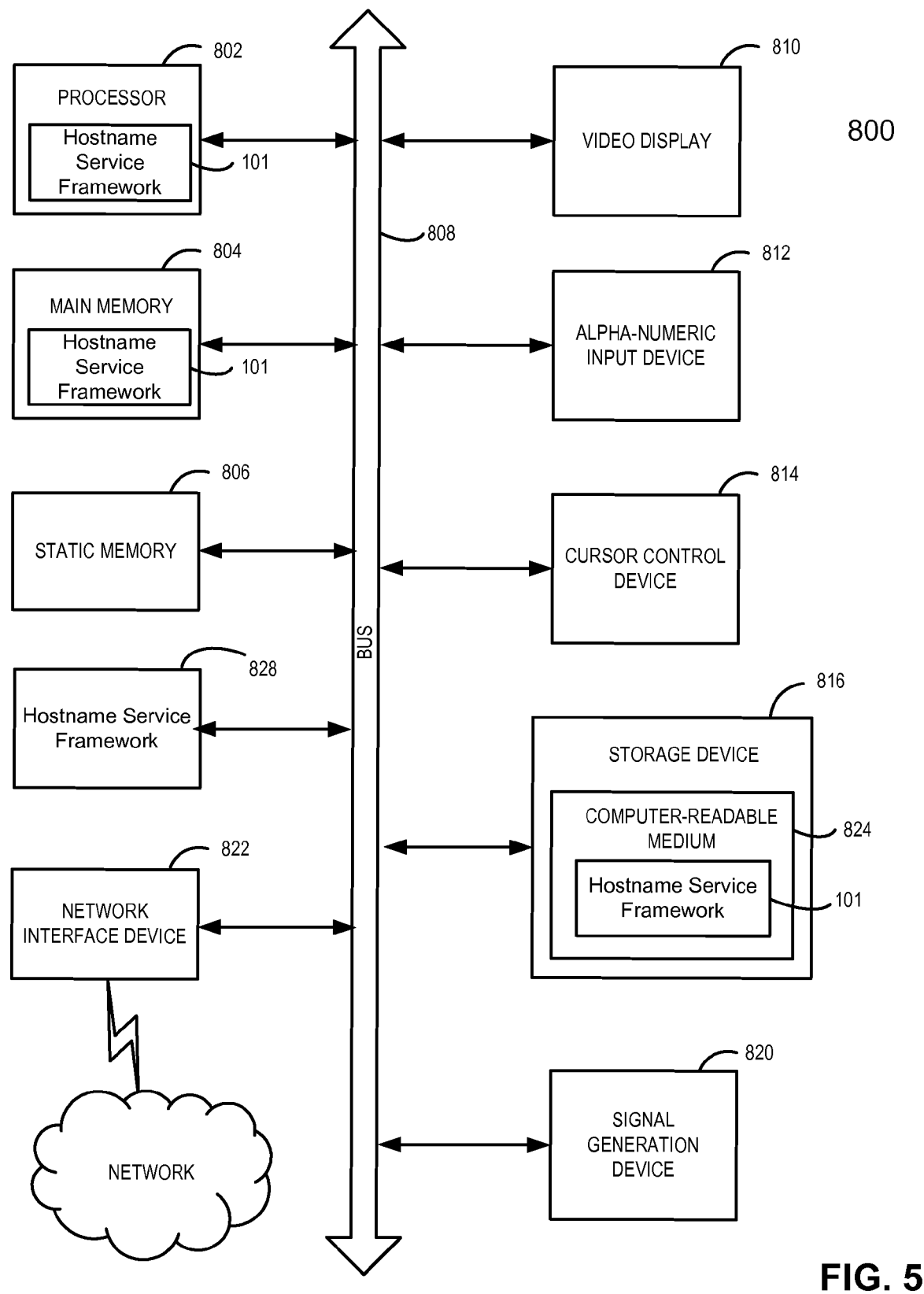
FIG. 5 illustrates a diagrammatic representation of a machine in the exemplary form of a computer system which may be used with an embodiment of the invention.

FIG. 5 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 101 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., the hostname service framework 101, which may be implemented as part of package installer 109, package builder 104, and/or metadata manager 105) embodying any one or more of the methodologies or functions described herein. The hostname service framework 101 may also reside, completely or at least partially, within the main memory 804 and/or within the processor 802 during execution thereof by the computer system 800, the main memory 804 and the processor 802 also constituting machine-accessible storage media. The hostname service framework 101 may further be transmitted or received over a network via the network interface device 822.

The computer-readable storage medium 824 may also be used to store the hostname service framework 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "associating" or "providing" or "determining" or "returning" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:

associating, by a hostname configuration unit executed by a processor, a display hostname with a regular hostname of a host, the regular hostname identifying the host and the display hostname identifying a service associated with the host, the service being provided by a client application;

associating, by the hostname configuration unit executed by the processor, a graphical representation with the display hostname;

providing, by a hostname query unit, to the client application the regular hostname, the display hostname, and the graphical representation in response to a request for hostname data received from the application, wherein the regular hostname, the display hostname, and the graphical representation are used by the client application to advertise the service to allow a remote node to access the advertised service of the application over a network;

determining, by the hostname query unit, whether a hostname provider has registered with the host;

returning, by the hostname query unit, a transient hostname provided by the hostname provider to the application in place of the regular hostname, if the hostname provider has registered with the host;

displaying a graphical user interface (GUI) on a display device of the host, the GUI comprising a first field to accept the display hostname from a user and a graphical representation selector to allow the user to specify the graphical representation to be associated with the display hostname entered in the first field;

in response to an input from the user via the GUI, storing the display hostname and the selected graphical representation as hostname data in a storage device;

displaying a second field on the GUI to allow the user to specify a regular hostname; and storing the regular hostname entered in the second field as a part of the hostname data in the storage device; and displaying a third field on the GUI to allow the user to specify whether the transient hostname provided by the hostname provider supersede the regular hostname entered from the second field when the host enters the network, wherein if the user enters a predetermined input in the third field, the transient hostname is returned to the application in place of the regular hostname.

2. A non-transitory computer readable medium comprising instructions that, when executed by a processor, cause the processor to execute operations comprising:

associating, by a hostname configuration unit executed by the processor, a display hostname with a regular hostname of a host, the regular hostname identifying the host and the display hostname identifying a service associated with the host, the service being provided by a client application;

associating, by the hostname configuration unit executed by the processor, a graphical representation with the display hostname;

providing, by a hostname query unit, to the client application the regular hostname, the display hostname, and the graphical representation in response to a request for hostname data received from the application, wherein the regular hostname, the display hostname, and the graphical representation are used by the client application to advertise the service to allow a remote node to access the advertised service of the application over a network;

determining, by the hostname query unit, whether a hostname provider has registered with the host;

returning, by the hostname query unit, a transient hostname provided by the hostname provider to the application in place of the regular hostname, if the hostname provider has registered with the host;

displaying a graphical user interface (GUI) on a display device of the host, the GUI comprising a first field to accept the display hostname from a user and a graphical representation selector to allow the user to specify the graphical representation to be associated with the display hostname entered in the first field;

in response to an input from the user via the GUI, storing the display hostname and the selected graphical representation as hostname data in a storage device;

displaying a second field on the GUI to allow the user to specify a regular hostname; and storing the regular hostname entered in the second field as a part of the hostname data in the storage device; and displaying a third field on the GUI to allow the user to specify whether the transient hostname provided by the hostname provider supersede the regular hostname entered from the second field when the host enters the network, wherein if the user enters a predetermined input in the third field, the transient hostname is returned to the application in place of the regular hostname.

3. A system, comprising:

a storage device; and a processor coupled to the storage device, the processor to execute a host name configuration unit and a host name query unit, the hostname configuration unit to associate a display hostname with a regular hostname of a host, the regular hostname identifying the host and the display hostname identifying a service associated with the host, the service being provided by a client application, the hostname configuration unit further to associate a graphical representation with the display hostname, the hostname query unit coupled to the hostname configuration unit to:

provide to the client application the regular hostname, the display hostname, and the graphical representation in response to a request for hostname data received from the client application, wherein the regular hostname, the display hostname, and the graphical representation are used by the client application to advertise the service to allow a remote node to access the advertised service of the application over a network, determine whether a transient hostname provider has registered with the host;

return a transient hostname, the display hostname, and the graphical representation to the client application, when the transient hostname provider has registered the hostname provider with the host, display a graphical user interface (GUI) on a display device of the host, the GUI comprising a first field to accept the display hostname from a user and a graphical representation selector to allow the user to specify the graphical representation to be associated with the display hostname entered in the first field;

in response to an input from the user via the GUI, store the display hostname and the selected graphical representation as hostname data in a storage device;

display a second field on the GUI to allow the user to specify a regular hostname; and storing the regular hostname entered in the second field as a part of the hostname data in the storage device; and display a third field on the GUI to allow the user to specify whether the transient hostname provided by the hostname provider supersede the regular hostname entered from the second field when the host enters the network, wherein if the user enters a predetermined input in the third field, the transient hostname is returned to the application in place of the regular hostname.

* * * * *